United States Patent [19]

Brown

[11] 4,281,845
[45] Aug. 4, 1981

[54] DRIVE SYSTEM FOR BICYCLES AND OTHER APPARATUS

[76] Inventor: Lawrence G. Brown, 1629 Kuhilani St., Honolulu, Hi. 96821

[21] Appl. No.: 55,017

[22] Filed: Jul. 5, 1979

[51] Int. Cl.³ .............................................. F16H 29/04
[52] U.S. Cl. .................................. 280/236; 74/594.2; 74/594.3; 74/781 B; 474/71; 474/72
[58] Field of Search ............... 280/259, 236, 260, 261, 280/262; 74/594.3, 594.2, 594.1, 804, 803, 36, 437, 217 B, 243 NC, 781 B

[56] References Cited

U.S. PATENT DOCUMENTS

| 512,479 | 1/1894 | McKenzie et al. | 74/781 B |
| 4,133,550 | 1/1979 | Brown | 280/210 |
| 4,159,652 | 7/1979 | Trammell | 74/217 B X |

FOREIGN PATENT DOCUMENTS

379 of 1898 United Kingdom ................... 74/781 B

*Primary Examiner*—David M. Mitchell
*Assistant Examiner*—Randall A. Schrecengost
*Attorney, Agent, or Firm*—Bruce G. Klaas

[57] ABSTRACT

An input-output force correlated drive system for driving a driven device such as the rear wheel of a bicycle or the like comprising: input force applying apparatus for transmitting input force to and causing operation of the drive system; rotatable output force transfer apparatus operable by the input force applying apparatus for transferring output force to the driven device; and input-output force correlation apparatus being continuously operatively connected to and operable by the input force applying apparatus and being continuously operatively connected to and operating the output force transfer apparatus for variably changing the rotational speed and circumferential location of the output force transfer apparatus relative to the input force applying apparatus during each revolution in accordance with predetermined input-output force correlation characteristics to be provided by the drive system.

34 Claims, 9 Drawing Figures

DRIVE SYSTEM FOR BICYCLES AND OTHER APPARATUS

BACKGROUND AND SUMMARY OF INVENTION

This invention relates to drive systems for bicycles and other devices of the type wherein input force is varied during transmittal to a rotary output device to produce an output force of varying magnitude which is variously applied to the rotary output device during each revolution thereof.

This application is related to my prior U.S. Pat. No. 4,133,550, the disclosure of which is specifically incorporated herein by reference.

As disclosed in my prior patent, it is advantageous to provide a drive system for a bicycle, or any other rotary power transmission apparatus, which has input-output force correlation means operably connected to and operable by the crank arm means for correlating input force applied to the crank arm means with output force delivered to the rear wheel, or any other driven device, during the power input cycle while continuously maintaining the application of output force to the rear wheel throughout each power input cycle. In such a system, the apparatus is constructed and arranged for varyingly applying input force during repetitive power input cycles of a rotary or reciprocating input system of a bicycle or the like operatively connected to a rotary output system of a bicycle in which the input system is subject to varying magnitude and direction of application of input force and varying effective resistance of the output system during each power input cycle; varying the magnitude and direction of the transmitted input force during each power input cycle by continuously varying the effective radial and circumferential location of application of the transmitted input force in accordance with the varying effective resistance characteristics encountered by the input system; and continuously maintaining the application of the transmitted input force to the rotary output system throughout each power input cycle. In such a system, maximum transmitted input force may be generated at those circumferential locations of the application of input force to the system at which the effective input force is minimal, or maximum transmitted input force may be generated at those circumferential locations of the application of input force to the input system at which the effective input force is maximal. The variations in magnitude and direction of the transmitted input force are selected in accordance with predetermined desired variations of the input force which may be based upon varying capabilities of bicycle riders. In such a system, the rear wheel position is varied relative to the pedal position during each 360° input force application cycle so that the effective resistance of the rear wheel to rotation is variably transferred to the pedals in a predetermined manner. The amount of input force required to overcome the effective resistance of the rear wheel to rotation at each rear wheel position during each 360° input force application cycle is reduced while varying the rear wheel position relative to the pedal position during each 360° input force application cycle so that the effective resistance of the rear wheel to rotation is variably transferred to the pedals during each 360° input force application cycle in a predetermined manner. The effective resistance of the rear wheel to rotation may be varied in accordance with and relative to pedal position so as to variously match the maximum input force capability of the rider with the resistance to rotation of the rear wheel or to variously match the maximum input force capability of the rider with the maximum effective resistance of the rear wheel to rotation. Such system requires substantially less pedal input force to overcome a given resistance. It may be designed to effect the magnitude of the applied input force relative to output resistance or the magnitude of output torque for a given input force at particular pedal-wheel positions during each revolution.

In general, the drive system of the present invention provides similar results and comprises: input force applying means for applying force to the drive system; rotatable output force transfer means for transferring output force to the rear wheel of the bicycle; mounting means for rotatably mounting said rotatable output force transfer means and enabling rotation thereof relative to the mounting means in both forward and rearward directions; input force transfer means for transferring input force from the input force applying means to the rotatable output force transfer means to cause rotation thereof in the forward direction and transfer of output force to the rear wheel; input-output force correlation means operatively associated with the input force transfer means for correlating input-output forces by forward and rearward relative rotative displacement of the rotatable output force transfer means and the input force transfer means during each revolution of the drive system.

The input-output force correlation means comprises cam means mounted in juxtaposition to and operative relationship with the rotatable output force transfer means and the input force transfer means for controlling the amount and location of the relative rotative displacement therebetween during each revolution of the drive system.

The cam means comprises a cam track having a continuous cam surface extending 360° about the axis of rotation of the rotatable output force transfer means; and cam follower means movably mounted on the cam surface on the cam track for continuous movement therearound during each revolution of the drive system.

The input-output force correlating means further comprises oscillator means operatively connected to the cam follower means and to the rotatable output force transfer means for causing relative rotative displacement of the rotatable output force transfer means. The oscillator means may be pivotally or axially displaceable by the cam means. The oscillator means may be directly connected to the output force transfer means or may be indirectly connected thereto through gear means such as a planetary gear system. An inclined slot means, with a cam driven roller means mounted therein, may be fixedly or adjustedly associated with the output force transfer means for modifying the effect of the cam means on the output force transfer means.

In use as a drive system for a bicycle or the like, the drive system connects the pedal operated crank arms to a rotatable sprocket wheel mounted coaxially with a rotatable crank shaft driven by the pedal operated crank arms. The sprocket wheel is rotatably mounted on the crank shaft which is rotatably supported in the conventional crank shaft housing mounted on the bicycle frame. The cam means is in the form of a plate fixedly mounted on the crank shaft housing circumjacent and axially adjacent one end of the crank shaft so that the cam surface extends thereabout. The oscillator means is mounted between the sprocket wheel and the plate is closely spaced axial relationship therewith. Thus, the drive system of the present invention may be readily adapted for use with other conventional drive system apparatus of otherwise conventional bicycles while providing the advantageous results described herein and in my prior patent.

BRIEF DESCRIPTION OF DRAWING

Illustrative and presently preferred embodiments of the invention are shown on the accompanying drawing in which.

FIRST EMBODIMENT

Figure 1:
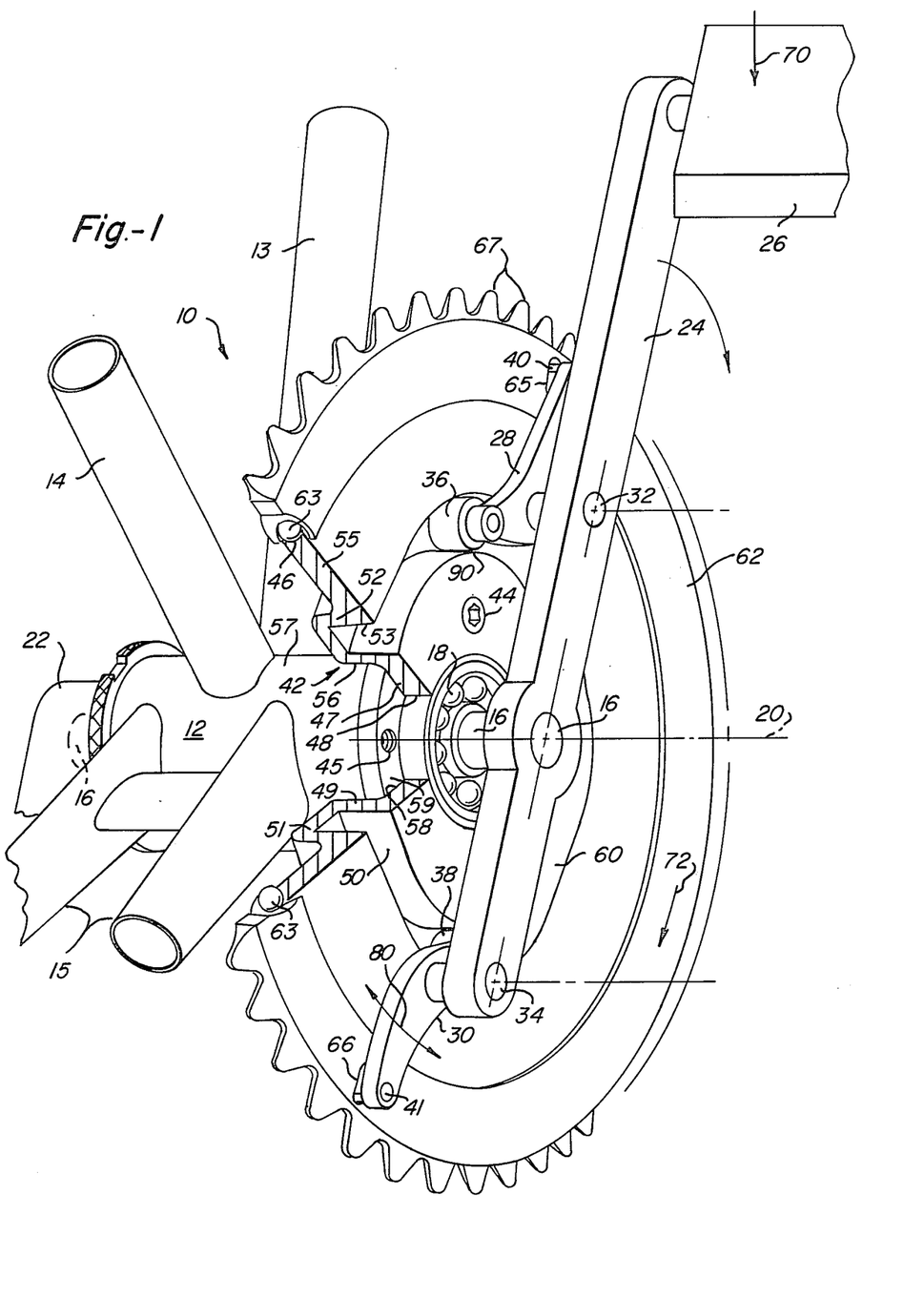
FIG. 1 is a schematic perspective view of a first embodiment as mounted on a bicycle.
Figure 2:
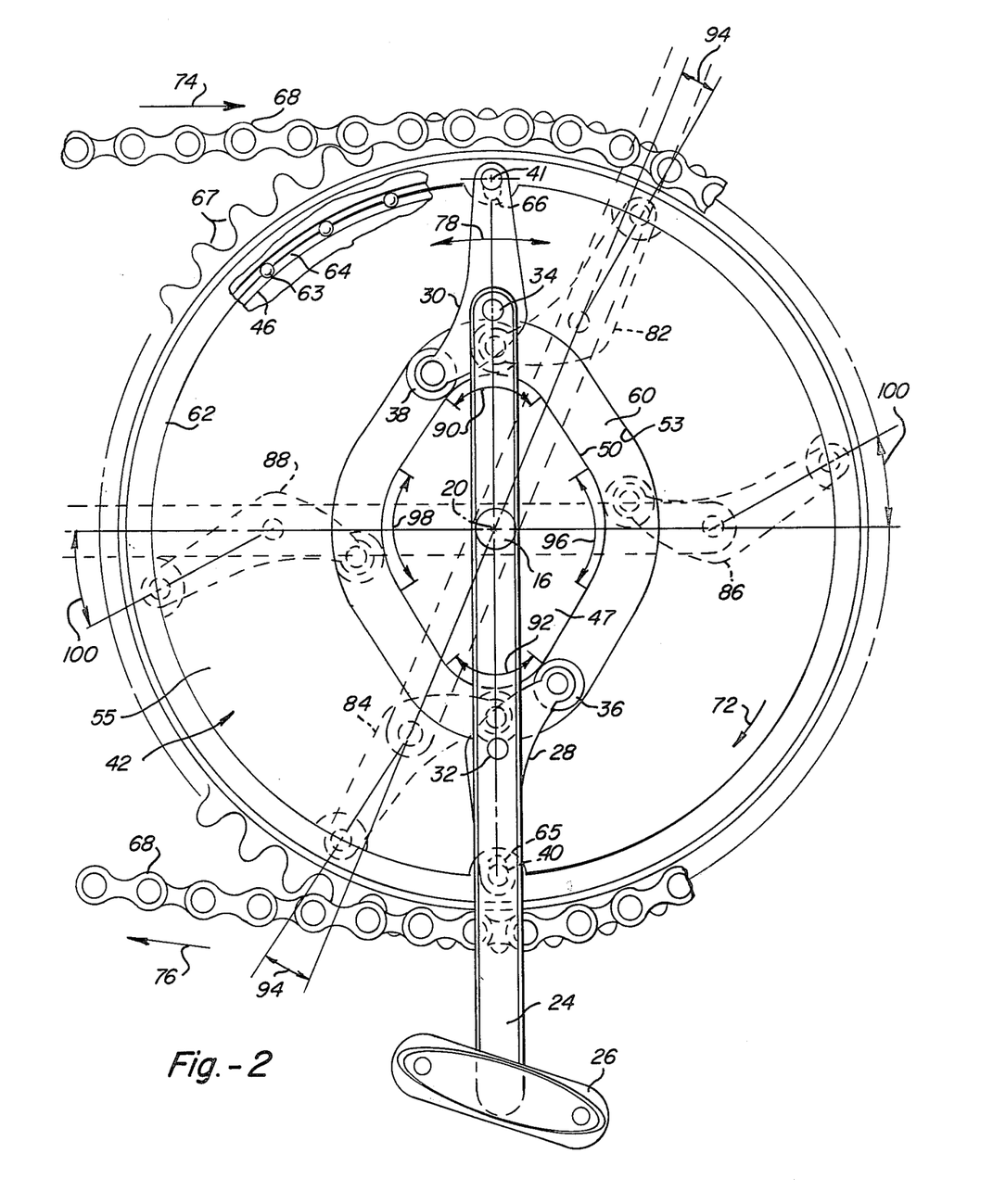
FIG. 2 is an enlarged schematic side elevational view of a portion of the apparatus of FIG. 2.

In the embodiment of FIGS. 1 & 2 the drive system of the present invention is shown in association with a portion of a bicycle 10 having a crank hub 12 fixedly attached to frame portions 13, 14, 15 in a conventional manner. A crank shaft 16 is rotatably mounted in hub 12 by suitable bearing means (not shown) in the hub 12 and a bearing means assembly 18 outside the hub to provide a central axis of rotation 20. A pair of crank arm members 22, 24 are fixed to opposite end portions of crank shaft 16 and extend radially outwardly therefrom in opposite directions in 180° spaced relationship. A pedal 26 is associated with each crank arm. One of the crank arms 24 has a pair of oscillator means in the form of lever members 28, 30 pivotally attached thereto by pivot pins 32, 34 located equal radial distances outwardly of central axis 20. Each lever member carries a cam follower roller member 36, 38 on a radially innermost end portion and a pin member 40, 41 on a radially outermost end portion.

An annular mounting means in the form of a plate member 42 is fixedly removably mounted on one end of hub 12 axially adjacent crank arm 24 by suitable threaded mounting means 44, 45. Plate member 42 comprises an annular outermost peripheral surface 46; a radially innermost radially extending portion 47 having a central bore 48 which mounts bearing assembly 18; an axially inwardly extending portion 49 having an axially inwardly extending radially outermost peripheral contoured cam surface 50; a radially intermediate radially outwardly extending portion 51 which is axially inwardly offset relative to portion 47; a radially intermediate axially outwardly extending portion 52 connected to portion 51 having an axially outwardly extending contoured cam surface 53 which is located in radially outwardly spaced parallel relationship to cam surface 50; and a radially outermost radially outwardly extending portion 55 located in parallel coplanar axial alignment with the radially innermost portion 47 and bearing assembly 18. Axially inwardly extending inner peripheral surface 56 may be supported on the outer peripheral surface 57 of hub 12 and radially extending axially inner surface 58 is supported on end surface 59 of the hub. A cam track means 60 is thus provided by the symmetrical oppositely facing cam surfaces 50, 53 in plate member 42 for receiving cam follower roller members 36, 38 in axially alignment with bearing assembly 18.

Rotatable output force transfer means in the form of an annular sprocket ring member 62 is rotatably mounted on the outer periphery of plate member 42 by suitable mounting means such as ball bearing members 63 of a ball bearing assembly 64, FIG. 2. Circumferentially opposite radially extending elongated slots 65, 66 in the side wall of ring member 62 slidably receive the pin members 40, 41. Sprocket teeth 67 are provided on the outer periphery of ring member 62 to receive a conventional continuous loop drive chain member 68, FIG. 2, which drives a conventional one speed sprocket wheel or a stack of multiple speed sprocket wheels associated with the rear wheel of the bicycle.

In operation of the apparatus of FIGS. 1 & 2 input force is applied to the input force applying means, in the form of pedal 26, in the direction of arrow 70 during each 180° downward power stroke of each revolution from the uppermost 0° pedal position to the lowermost 180° pedal position. Input force is similarly applied to the other pedal during the other half of each revolution. Shaft 16, crank arms 22, 24, pins 32, 34, oscillators 28, 30, and pins 40, 41 provide input force transfer means for transferring input force to the sprocket 62 to cause rotation in the direction of arrow 72 and movement of chain 68 in the direction of arrows 74, 76, FIG. 2. As crank arm 24 is rotated, it carries the oscillators 28, 30 in a circular path about central axis 20 with cam followers 36, 38 moving along the cam track 60 to cause continuous equal pivotal displacement of the oscillators about pins 32, 34 as indicated by arrows 78, 80. The pivotal oscillation of the oscillators causes circumferential forward and rearward displacement of sprocket 62 relative to plate 42 and relative to the crank arms 22, 24, as illustrated in phantom in FIG. 2 at 82, 84 and 86, 88, respectively, so as to uniformly change the pedal positions relative to the sprocket during each revolution whereby to provide input-output force correlating means as described in my prior patent. Slots 65, 66 enable the pivotal oscillating movement and circumferential displacement of the sprocket. The symmetrical non-circular contour of the cam track 60 controls the amount and location of the circumferential displacement and is chosen in accordance with predetermined desired input-output force correlation characteristics to be provided in the drive system for particular persons, e.g., men, women or children, and purposes, e.g. racing, touring, transportation, exercise, etc., as described in my prior patent.

With the illustrative contour of FIG. 2, the sprocket 62 is advanced as illustrated in the illustrative embodiment of FIG. 2, at the 0° and 180° pedal-crank arm positions, the centerlines of the crank arms 22, 24 and the sprocket drive pins 40, 41 are radially aligned so that the relative circumferential displacement between the sprocket and the crank arms is 0°. As the crank arms move beyond the 0° and 180° pedal-crank arm positions, maximum advancement is provided along the cam surface portions 90, 92 as indicated by positive lead angle 94. Maximum retardation is provided by cam surface portions 96, 98 at the 90° and 270° pedal positions as indicated by negative lag angles 100. Thus, the effective input force may be variously matched with the effective resistance so as to enable more effective power utilization, ie. provide higher efficiency. This feature is particularly advantageous in use of the drive system in exercise programs for rehabilitation of persons who are physically handicapped because of a lesser input force requirement for equivalent work of a conventional drive system. The present system may be used with all presently available bicycles including the various 1, 3, 5 and 10 speed drive systems utilized therewith because the rearend of chain 68 can be associated with any type of rear wheel sprocket arrangement in any conventional manner. Also, the drive system may be easily mounted and removed to facilitate assembly, change of parts, maintenance and repair. The size of the system may be approximately the same as the size of conventional sprockets for a given gear ratio or of reduced size as hereinafter described. The system may be used on any kind of velocipede, stationary bicycle type exercise apparatus, motor driven apparatus, or the like.

SECOND EMBODIMENT

Figure 3:
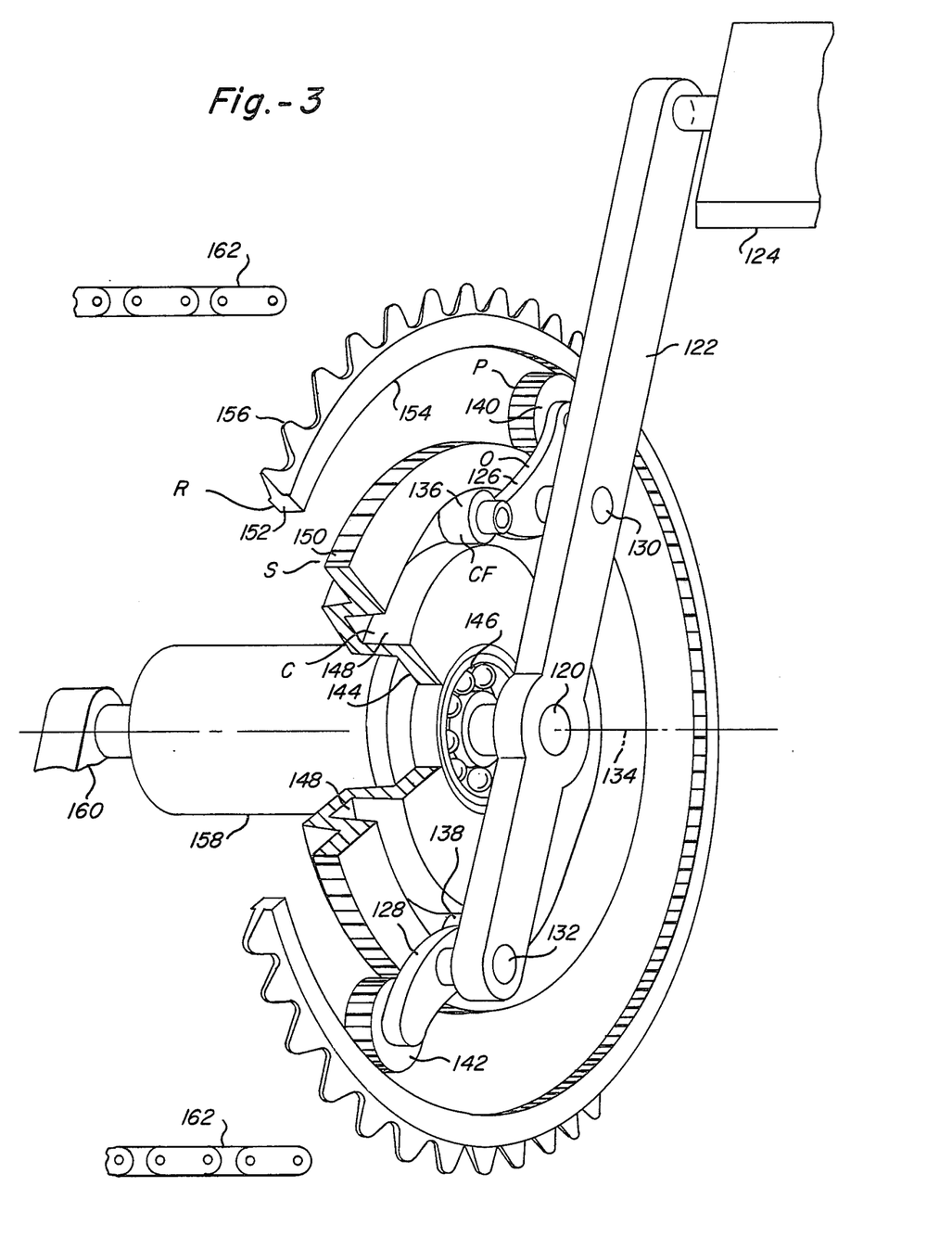
FIG. 3 is a schematic perspective view of a second embodiment as mounted on a bicycle.

In the embodiment of FIG. 3, a drive shaft means 120, such as a bicycle crank shaft, is rotatably driven by suitable input force applying means, such as one or more bicycle crank arm members 122 having a pedal 124 mounted on one end portion thereof. Oscillator means 126, 128 are pivotally attached to the crank arm 122 by pin means 130, 132 located equal radial distances from the axis of rotation 134 of the input force applying means. Cam follower roller means 136, 138 and planetary gear means 140, 142 are rotatably mounted on each oscillator means. An annular plate means 144 is fixedly mounted circumjacent shaft means 120 in juxtaposition to crank arm means 122 by any suitable mounting means (not shown). A cam track means 148 is provided in a radially intermediate portion of the annular plate means 144 and cam follower roller means 136, 138 are mounted therein at opposite 180° positions. The symmetrical non-circular contour of cam track means is chosen to provide predetermined input-output characteristics as described in my prior patent. Sun gear means 150 are provided on the periphery of annular plate means 144. A rotatable output force transfer means in the form of a ring member 152 is rotatably mounted in radially spaced circumjacent relationship to drive shaft means 120 and annular plate means 144 by any suitable axially confined mounting means (not shown). Plant gear means 140, 142 are mounted on oscillator means 130, 132 in opposed relationship to roller means 136, 138 between and in operative engagement with sun gear means 150 and a ring gear means 154 provided on the inner periphery of ring member 152. A chain sprocket means 156 is provided on the periphery of ring member 152 to receive and drive a chain 162 connected to the rear wheel of a bicycle. The gear ratios may be chosen to provide any desired input-output speed relationship; however, in usage in a bicycle drive system, it is desirable to provide an increase in the speed ratio of, for example, 2:1 or 3:1 so that the diameters of the parts may be relatively small to reduce size and space requirements.

In usage in a bicycle drive system, shaft means 120 is mounted in a conventional manner in the crank shaft hub 158 with a conventional pedal driven crank arm 160 mounted on one end of shaft 120 and with the drive system, including crank arm 122 mounted on the opposite end of shaft 120. A conventional continuous loop drive chain 162 is mounted on sprocket means 156 and extends rearwardly to the rear wheel whereat it is drivably associated with the rear wheel by any suitable conventional sprocket means including any conventional multiple speed system.

In operation, shaft means 120 is rotated by input force applied through the crank arms 120, 160. During rotation, oscillator means 130, 132 are carried by crank arm 120 along a circular path defined by the movement of pin means 130, 132. Planet gear means 140, 142 are carried by the oscillator means between and along a circular path defined by the sun gear means 150 and the ring gear means 154 to cause rotation of the ring member 152. The circumferential locations of planet gears 140, 142 relative to the crank arm 122 is continuously equally variably controlled by cam track means 148 through roller means 136, 138 and oscillator means 126, 128 which are pivotally displaceable relative to pin means 130, 132. Thus, the locations of the planet gears may be advanced or retarded relative to the crank arms 122, 160 to provide input-output force correlating means as described in my prior patent.

THIRD EMBODIMENT

Figure 4:
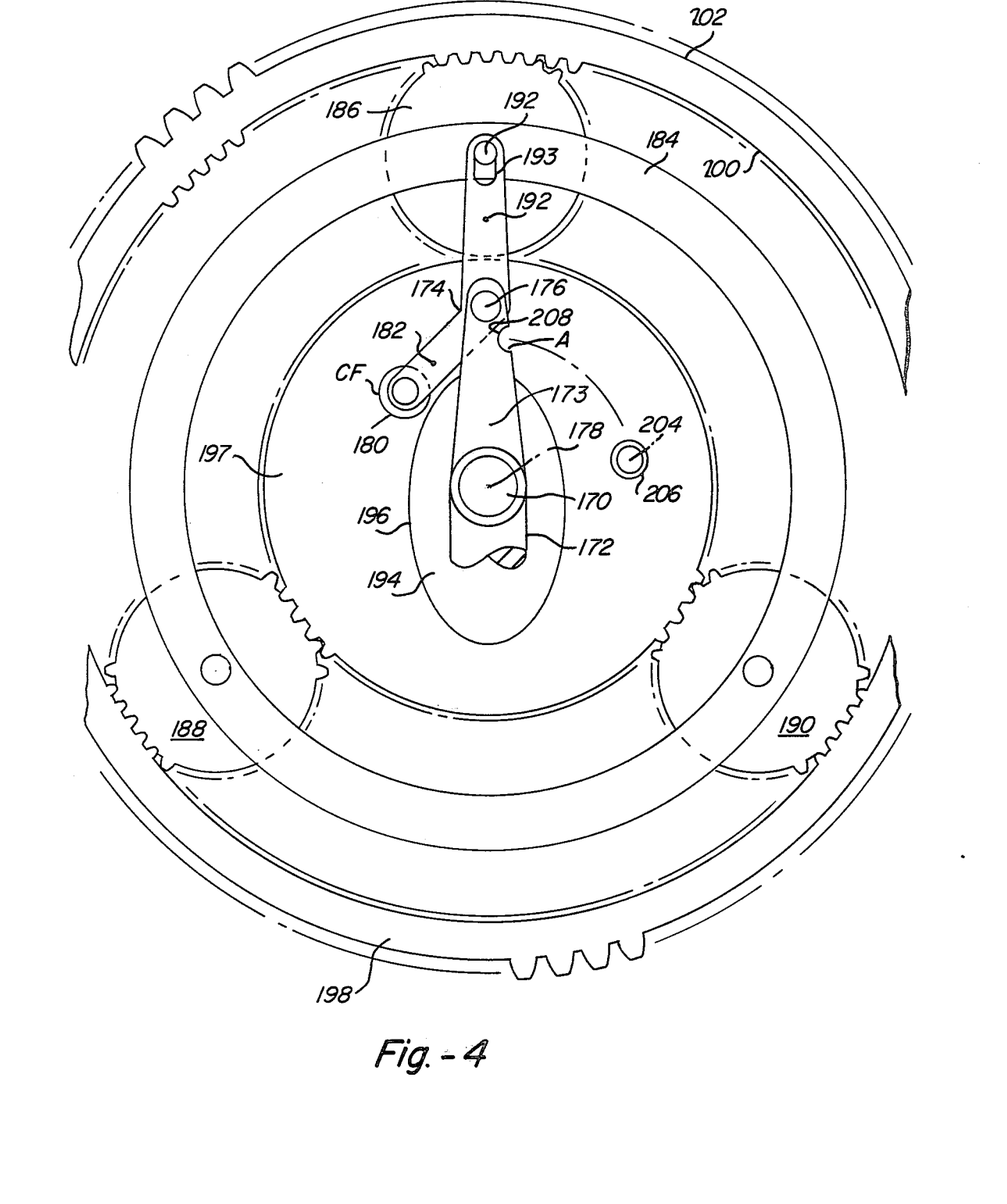
FIG. 4 is a schematic side elevational view of a third embodiment.

In the embodiment of FIG. 4, a rotatable drive shaft means 170, such as a bicycle crank shaft, is driven by suitable input force applying means 172, such as the pedal driven bicycle crank arms previously described, having an end portion 173. An oscillator means 174 is pivotally attached to crank end portion 173 by pin means 176 located radially outwardly of the axis of rotation 178 of the input force applying means. A cam follower roller means 180 is mounted on one oscillator leg portion 182 and a planetary gear supporting ring 184, having planetary gears 186, 188, 190 mounted thereon, is connected to the other oscillator leg portion 191 by a pin 192 in slot 193. A cam means 194, having a symmetrically contoured cam surface 196, is fixedly mounted relative to shaft means 172 for continuous engagement with cam follower means 180. The contour of cam surface is chosen to provide any desired predetermined input-output force correlation as described in my prior patent. A sun gear means 197 is fixedly or rotatably mounted circumjacent drive shaft means 170 in axially offset relationship to cam means 194 and in axial alignment with planetary gear means 186, 188, 190 which are driveably engaged with teeth on the periphery thereof. A rotatable output force transfer means, in the form of a ring gear member 198, having internal teeth on inner surface 200 and external teeth on outer surface 202 is rotatably mounted in circumjacent driveable engagement with sun gear means 186, 188, 190 by any suitable axially confining mounting means (not shown). The gear ratios are chosen to provide any desired input-output speed relationship.

In use of the drive system, on a bicycle as previously described or any other apparatus, during rotation of crank arm means 172, oscillator means 174 is carried in a circular path while being variably pivotally displaced relative to arm portion 173 by cam follower means 180 in accordance with the contour of cam surface 196 to advance and retard the position of the plant gear means 186, 188, 190 by circumferential displacement of carrier ring means 184. In this manner, the relative circumferential positions of the ring gear means 198 and the drive shaft means 170 as well as the input force means 172 is continuously variable to provide desired input-output force correlation therebetween.

Figure 5:
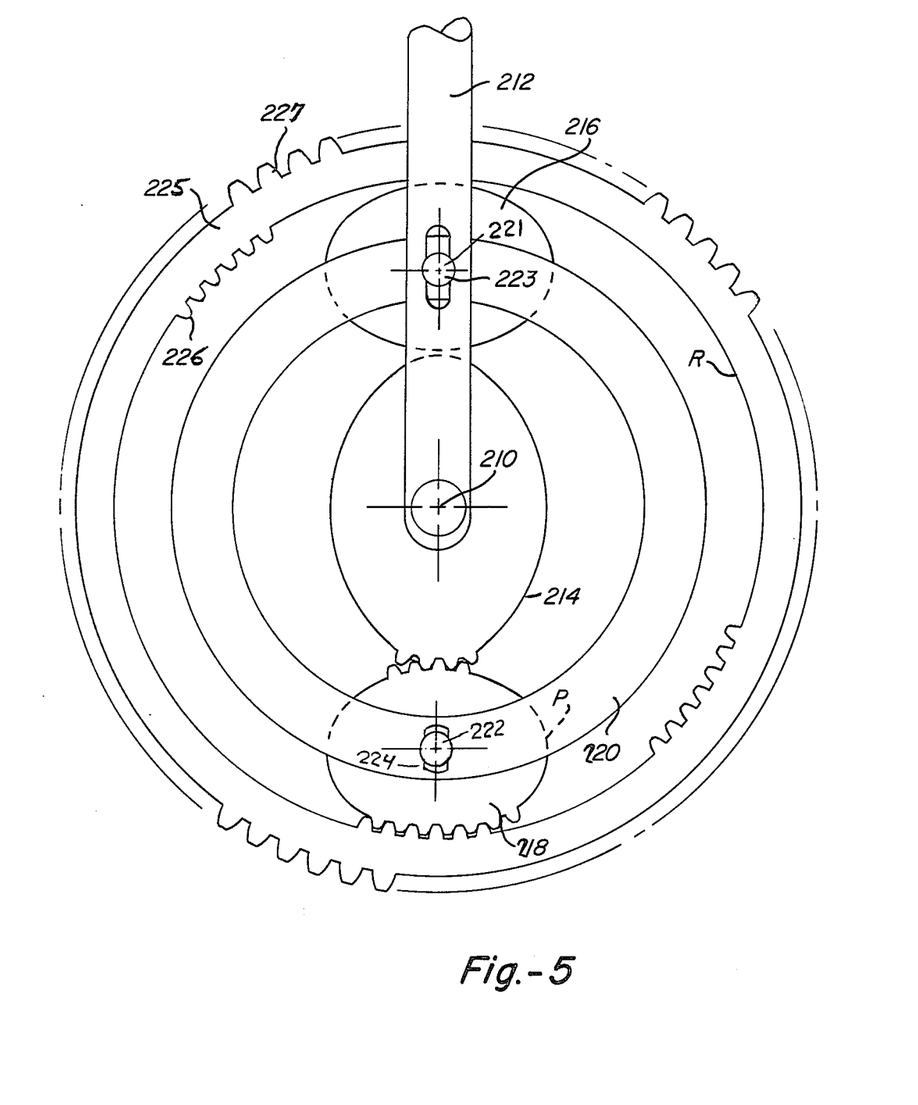
FIG. 5 is a schematic side elevational view of a fourth embodiment.

The planetary gear means systems of FIGS. 3-5 are readily adaptable to incorporation of speed change means by use of conventional methods such as selective restraint of one or more of a rotatable sun gear, the planet gears and/or the ring gear. For example, in the embodiment of FIG. 4, sun gear 197 may be rotatably mounted on shaft 170. An axially slidable pin 204 is suitably mounted for axial movement in a bore 206 in the sun gear between a holding position whereat one end portion of the pin 204 is located in bore 206 with the other end portion located in a fixed bore in the frame (not shown) to prevent rotation of the sun gear and an axially displaced driving position whereat the one end portion of the pin is located in the path of movement of crank arm 173 for engagement with a notched portion 208 with the other end portion located in sun gear bore 206 whereby the sun gear is rotated with the crank arm to change the gear ratio.

FOURTH EMBODIMENT

In the embodiment of FIG. 5, a rotatable drive shaft means 210 is driven by suitable input force applying means 212, such as the pedal driven bicycle crank arms previously described. A non-circular shaped sun gear means 214 is mounted on shaft means 210 in axially offset relationship to input force applying means 212. A pair of non-circular shaped planet gear means 216, 218 are mounted in 180° opposed relationship on a carrier ring means 220 and connected thereto by pin means 221, 222 associated with slot means 223 in arm 212 and 224 in carrier ring means 220, the pin means 221 being drivably connected to input force applying means 212. An output force means, in the form of a ring gear 225 having internal and external toothed surfaces 226, 227, is mounted circumjacent the planetary gear means 216, 218 and driven thereby. The shape and perimetral length of the non-circular sun gear means 214 is symmetrically matched with the shape and perimetral length of each of the non-circular planet gear means 216, 218 so as to provide identical resistance characteristics for both pedals of a bicycle drive system during each revolution of drive shaft means 210. The shape of the non-circular sun gear means 214, and the non-circular planetary gear means 216, 218 determine the amount of relative circumferential displacement between the ring gear means 225 and the drive shaft means 210 to establish desired inputoutput force correlation characteristics of the system.

In operation, during each revolution of the input force applying means 212 and drive shaft means 210, the sun gear means 216, 218 are carried about the axis of rotation of the drive shaft means. During each revolution of the input force applying means, the planetary gear means 216, 218 revolve about their axis of rotation and transmit input force to ring gear means 225 which is rotated thereby at varying speeds under varying loads to obtain desired input-output force correlation in the drive system.

FIFTH EMBODIMENT

Figures 6, 7:
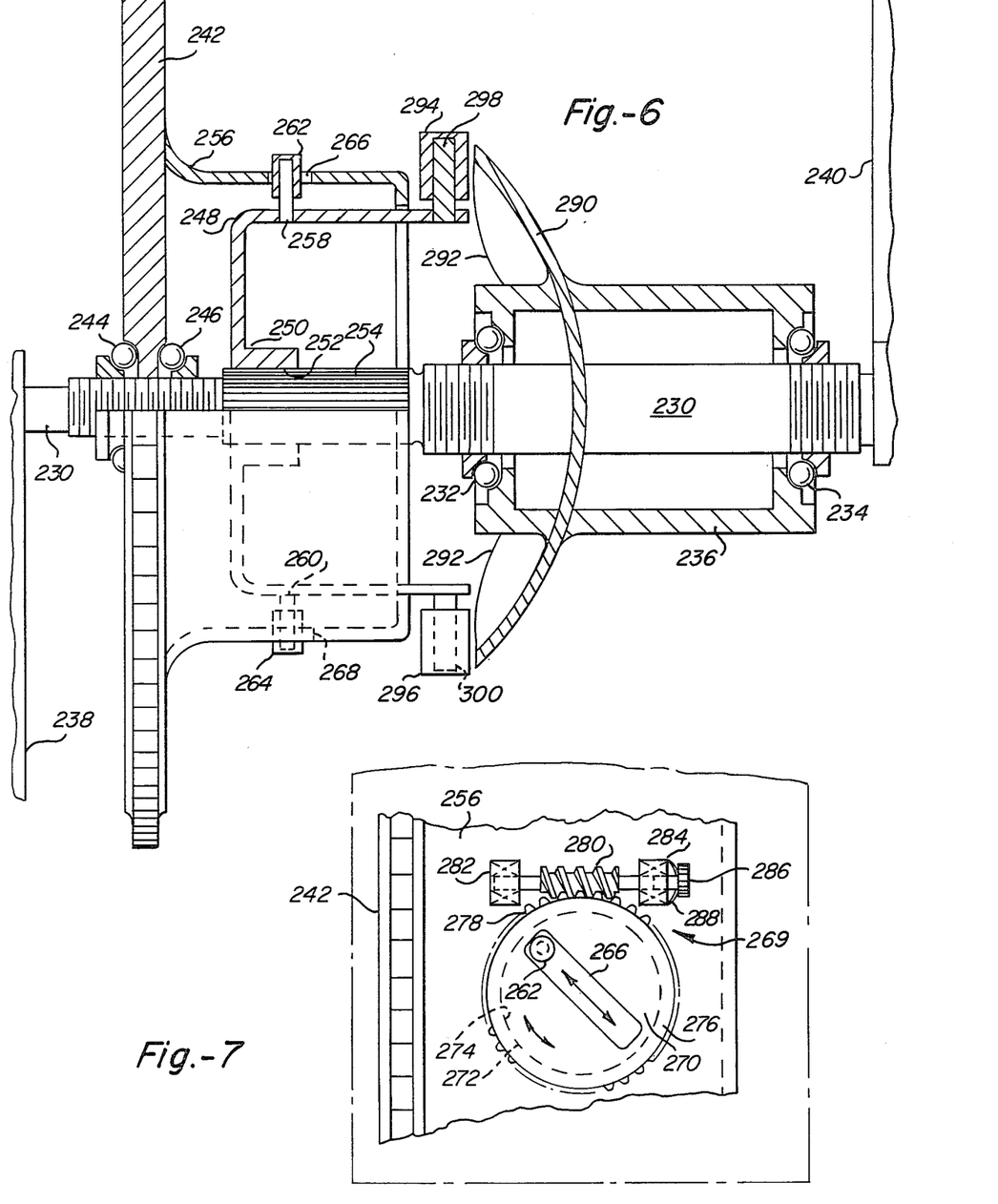
FIG. 6 is a schematic side elevational, partly in cross-section, of a fifth embodiment as mounted on a bicycle.
FIG. 7 is partial top view of a modification of the embodiment of FIG. 6.

In the embodiments of FIGS. 6 and 7, the drive system of the present invention comprises a drive shaft means 230, such as a bicycle crank shaft, rotatably mounted by bearing means 232, 234 in a crank hub 236 fixedly attached to a bicycle frame in a conventional manner. Suitable input force applying means, in the form of conventional pedal operated crank arms 238, 240, are suitably conventionally connected to opposite end portions of shaft 230. A chain driving sprocket wheel means 242 is rotatably mounted on one end portion of shaft 230 by bearing means 244, 246.

Input force transfer means are provided by an inner cup shaped member 248 having a hub portion 250 with a splined central bore 252 axially slidably and rotatably drivably mounted on a splined intermediate portion 254 of shaft 230. An outer cup shaped member 256 is fixed to sprocket wheel 242 and telescopically mounted circumjacent inner cup member 248 which is drivably connected thereto by pin members 258, 260 having roller members 262, 264 located in inclined slots 266, 268 which may be located in the periphery of cup 256 as shown in FIG. 6, or in adjustable threaded plug means 269, FIG. 7, by which the angle of inclination of the slots 266, 268 may be selectively varied to selectively change the input-output correlation characteristics of the system to accommodate different conditions of usage such as changes in terrain when riding a bicycle or preferences of a particular rider.

The adjustable plug means 269 comprises a plug member 270 having a stub shaft portion 272 rotatably mounted in a bore 274 in cup member 256 with an enlarged annular head portion 276 at the other end having spiral gear teeth 278 thereon and suitable retaining means (not shown), such as a threaded portion receiving a nut member, on the inner end. A worm gear member 280 is suitably rotatably mounted in bearing blocks 282, 284 affixed to cup member 256 with an adjustment nut 286 and lock washer 288 on one and thereof.

Input-output force correlation means are provided by cam means comprising a cam plate member 290 fixed on hub 236 with a suitably contoured cam surface 292 engageable by cam follower roller members 294, 296 mounted on pin members 298, 300 attached to the cup member 248.

In operation, applied input force is transferred from crank arms 238, 240 to sprocket wheel 242 through shaft 230, the inner cup member 248 via the splined connection between hub portion 250 and shaft portion 254, and the cup member 256 via the roller members 262, 264 and slots 266, 268. The sprocket wheel 242 is rotatably displaceable relative to the input force transfer means during axial relative displacement between cup members 248, 246, enabled by the splined connection therebetween and caused by continuous engagement of rollers 294, 296 with cam surface 292, due to the interaction of rollers 262, 264 in slots 266, 268. The amount of relative rotative movement between sprocket 242 and the input force transfer means is controlled by the contour of cam surface 292 and the angle of inclination and length of slots 266, 268 which are chosen as described in my prior patent. As shown in FIG. 7, the angle of inclination of slots may be selectively adjustable by use of a rotatable plug member 270 which is rotatable by turning worm gear 280.

SIXTH EMBODIMENT

Figure 8:
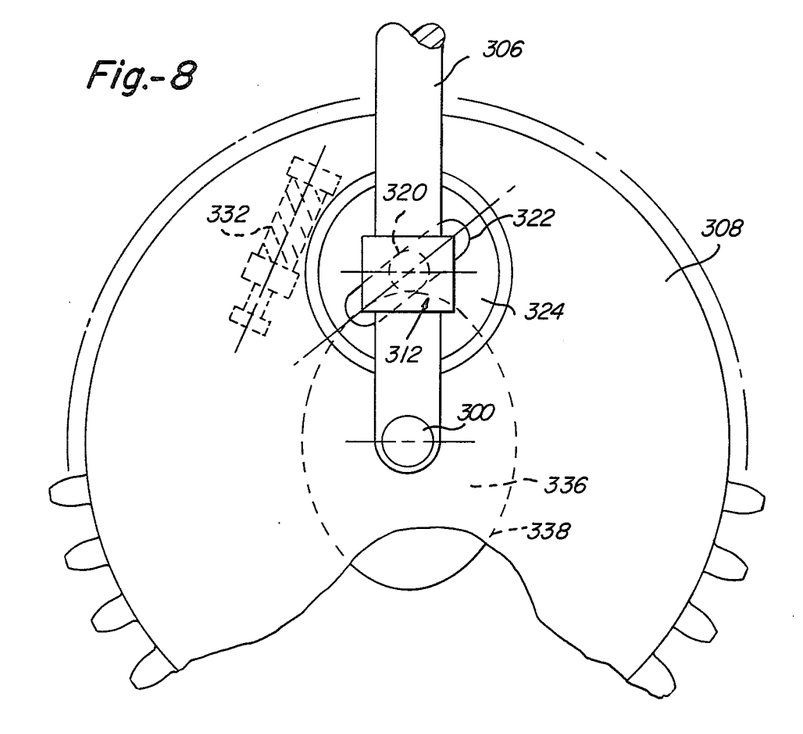
FIG. 8 is a schematic side elevational view of a sixth embodiment of the invention.
Figure 9:
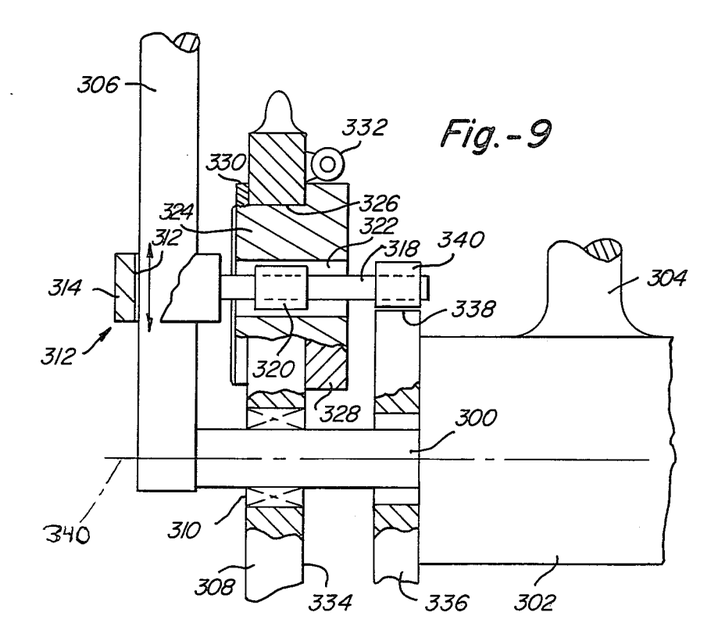
FIG. 9 is another side elevational view, partly in cross-section, of the apparatus of FIG. 8.

In the embodiment of FIGS. 8 and 9, the drive system of the present invention comprises a drive shaft means 300, such as a bicycle crank shaft, rotatably mounted in a crank hub 302 fixedly attached to bicycle frame portions 304 in a conventional manner. Suitable input force applying means, in the form of pedal operated crank arms 306, are suitably conventionally connected to opposite shaft end portions. A chain driving sprocket wheel means 308 is rotatably mounted on one end shaft portion by suitable bearing means 310.

Input force transfer means are provided by an oscillating slider means 312, in the form of a collar member 314 having a central bore 316 slidably mounted on a radially intermediate portion of crank arm 306 and a shaft member 318 suitably fixedly connected thereto. A roller member 320 is mounted on an intermediate portion of shaft 318 and received in a slot 322 in an adjustably rotatable plug member 324 mounted in a bore 326 in an intermediate portion of sprocket wheel 308. One end of plug member 324 is enlarged with spiral gear teeth 328 provided on the periphery thereof and the other end is threaded to receive a retaining nut 330.

A worm gear 332 is suitably mounted on the side surface 334 of sprocket wheel 308 in engagement with gear teeth 328 to enable adjustable rotatable movement of plug member 324 relative to sprocket wheel 308.

Input-output force correlation means are provided by cam means comprising a cam plate member 336 fixed on hub 302 with a suitably contoured cam surface 338 engageable by a cam follower roller means 340 mounted on the end portion of shaft 318.

In operation, applied input force is transferred from the crank arm means 306 to sprocket wheel 308 through slider 314, shaft 318 and roller 320 in slot 322 to drivingly rotate the sprocket wheel on bearing means 310 about shaft axis 340. The sprocket wheel 308 is variably forwardly and rearwardly rotatable displaceable relative to the crank arm and crank shaft in accordance with the radial positioning of shaft 318 by cam 336 and cam follower 340, the radial variation of the shaft 318 being accommodated by radial inward and outward movement of slider 314 on crank arm 306. The angle of inclination of slot 322 may be selectively varied by manual rotation of worm gear 332 so as to provide selectively adjustable control means for varying the amount and location of the relative rotative displacement of the sprocket during end revolution of the crank arm.

It is to be understood that, while the inventive concepts have particular advantages in use with bicycle drive systems, they are applicable to other kinds of velocipeds and to drive systems for other vehicles, such as automobiles and trucks, and machinery of various kinds. Thus, it is intended that the appended claims be construed to include alternative embodiments, modifications and uses except insofar as limited by the prior art.

What is claimed is:

1. A drive system for driving a driven device such as the rear wheel of a bicycle or the like comprising;
    input force applying means for applying force to the drive system;
    rotatable output force transfer means for transferring output force to the driven device;
    mounting means for rotatably mounting said rotatable output force transfer means and enabling rotation thereof relative to said mounting means in at least one direction;
    input force transfer means for transferring input force from said input force applying means to said rotatable output force transfer means to cause rotation thereof in the one direction and transfer of output force to the driven device; and
    input-output force correlation means operatively associated with said input force transfer means for correlating input-output forces by rotative displacement of said rotatable output force transfer means relative to said input force transfer means during each revolution of the drive system, which comprises cam means mounted in juxtaposition to and operative relationship with said rotatable output force transfer means and said input force transfer means for controlling the amount and location of the relative rotative displacement therebetween during each revolution of the drive system; and
    wherein said cam means comprises: cam track means having a continuous cam surface extending 360° about the axis of rotation of said rotatable output force means for variably changing the rotational speed and circumferential location of said output force transfer means relative to said input force transfer means; and
    cam follower means movably mounted on said cam surface in said cam track for causing relative movement between said cam track means and said follower means during each revolution of the drive system.

2. The invention as defined in claim 1 and wherein said input-output force correlating means further comprising:
    oscillator means being operatively connected to said cam follower means and to said rotatable output force transfer means for causing rotative displacement of said rotatable output force transfer means relative to said oscillator means.

3. The invention as defined in claim 2 and wherein:
    said oscillator means being connected to and movable with said input force transfer means for continuous movement therewith along a circular path during each revolution of the drive system.

4. The invention as defined in claim 3 and wherein:
    there being at least a pair of said cam follower means and said oscillator means spaced 180° from one another.

5. The invention as defined in claim 4 and wherein said oscillator means comprising:
    pivotal connecting means for connecting a portion of said oscillator means to said input force transfer means;
    first connecting means for connecting one end portion of said oscillator means to said cam follower means for causing pivotal movement of said oscillator means; and
    second connecting means for connecting the other end portion of said oscillating means to said rotatable output force transfer means for causing rotative displacement thereof.

6. The invention as defined in claim 5 and wherein said input force transfer means comprising:
    at least one crank arm member extending radially relative to the central axis of rotation of said rotatable output force transfer means;
    a crank shaft mounted in coaxial relationship with said rotatable output force transfer means and mounting and connecting said crank arm member;
    said crank arm member having a mid portion connected to said crank shaft and an end portion extending radially beyond said crank shaft;

one of said oscillator means being mounted on said end portion of said crank arm member; and the other of said oscillator members being mounted on said crank arm member on the radially opposite side of the crank shaft.

7. The invention as defined in claim 6 and further comprising:

hub means mounted on the frame of the bicycle for rotatably supporting said crank shaft;

said mounting means comprising an annular plate member having an annular outermost peripheral surface and being fixedly mounted on one end of said hub means axially next adjacent said crank arm member;

said cam track means being located on a side surface of said plate facing said crank arm member; and said oscillator means being located between said plate member and said crank arm member.

8. The invention as defined in claim 7 and wherein said plate member comprising:

a radially innermost portion mounted on one end of said hub means next adjacent said crank arm member.

9. The invention as defined in claim 8 and further comprising:

bearing means mounted in a central bore in said radially innermost portion for rotatably supporting said said crank shaft.

10. The invention as defined in claim 8 and wherein:

said radially innermost portion having an axially inwardly extending radially outermost peripheral surface defining said cam surface.

11. The invention as defined in claim 10 and wherein said plate member further comprising:

a radially intermediate radially outwardly extending first portion which is axially inwardly offset relative to said radially innermost portion; and a radially intermediate axially outwardly extending second portion connected to said first portion and being located in radially outwardly spaced parallel relationship to said cam surface to define said cam track means.

12. The invention as defined in claim 11 and wherein said plate member further comprising:

a radially outermost radially outwardly extending portion located parallel with said radially innermost portion and being axially aligned with said bearing means.

13. An input-output force correlated drive system for driving a driven device such as the rear wheel of a bicycle or the like comprising:

input force applying means for transmitting input force to and causing operation of the drive system;

rotatable output force transfer means operable by said input force applying means for transferring output force to the driven device; and input-output force correlation means being continuously operatively connected to and operable by said input force applying means and being continuously operatively connected to and operating said output force transfer means for variably changing the rotational speed and circumferential location of said output force transfer means relative to said input force applying means during each revolution in accordance with predetermined input-output force correlation characteristics to be provided by the drive system, which comprises cam means mounted in juxtaposition to and operative relationship with said rotatable output force transfer means and said input force applying means for controlling the amount and location of the relative rotative displacement therebetween during each revolution of the drive system; and wherein said cam means comprises: cam track means having a continuous cam surface extending 360° about the axis of rotation of said rotatable output force means for variably changing the rotational speed and circumferential location of said output, force transfer means relative to said input force applying means; and cam follower means movably mounted on said cam surface in said cam track for causing relative movement between said cam track means and said follower means during each revolution of the drive system.

14. The invention as defined in claims 1 or 12 and wherein said rotatable output force transfer means comprising:

a rotatable sprocket member being connected to the rear wheel of a bicycle.

15. The invention as defined in claims 1 or 12 and wherein:

said rotatable output force means comprising:

a rotatable ring gear member having sprocket teeth on the outer periphery thereof and internal gear teeth on the inner periphery thereof; and said input-output force correlating means comprising sun gear means and planetary gear means.

16. The invention as defined in claims 1 or 12 and wherein said input-output force correlating means comprising:

a planetary gear system having a sun gear member, a plurality of planet gear members, and a ring gear member.

17. The invention as defined in claim 16 and wherein said rotatable output force transfer means comprising:

sprocket teeth means on the outer periphery of said ring gear member for receiving and driving a chain.

18. The invention as defined in claims 1 or 12 and wherein:

said input force applying means comprising:

rotatable crank shaft means mounted on a bicycle and a pair of pedal operated crank arm means connected to opposite end portions of said crank shaft means for operation by a bicycle rider;

said output force transfer means comprising a rotatable ring member having inner and outer peripheral surfaces with sprocket teeth on the outer peripheral surface to engage and drive a chain operatively connected to the rear wheel of the bicycle; and said input-output force correlating means comprising:

oscillator means pivotally connected to and being continuously movable with said crank arm means in a circular path during each revolution thereof;

cam follower means mounted on said oscillator member for controlling pivotal movement thereof;

cam means fixedly mounted relative to said oscillator means and being engageable with said cam follower means during each revolution of said crank arm means for causing controlled variable pivotal displacement of said oscillator means relative to said crank arm means during each revolution thereof;

ring gear means on the inner peripheral surface of said rotatable ring member for causing rotation thereof;

planet gear means engaged with said ring gear means and being connected to and movable with said oscillator means for causing rotation of said ring gear means; and sun gear means engaged with said planet gear means for causing rotation thereof.

19. The invention as defined in claims 1 or 12 and wherein said input force transfer means comprising:

drive shaft means being mounted in coaxial relationship with said rotatable output force transfer means and having a splined portion thereon for causing rotation of said output force transfer means;

a splined member mounted on said splined portion of said drive shaft means and being rotatably driven thereby and being axially displaceable relative thereto; and pin and slot connecting means between said splined member and said rotatable output force transfer means for rotatably drivingly connecting said splined member to said rotatable output force transfer means and enabling forward and rearward rotative displacement of said rotatable output force transfer means relative to said input force transfer means.

20. The invention as defined in claim 19 and wherein said input-output force correlation means comprising:

a continuous cam surface extending 360° about said drive shaft means and being located in juxtaposition to said splined member; and cam follower means mounted on said splined member and being engaged with said cam surface for causing axial displacement of said splined member during rotation thereof by said drive shaft means.

21. An input-output force correlated drive system for driving a driven device such as the rear wheel of a bicycle or the like comprising:

input force applying means for transmitting input force to and causing operation of the drive system;

rotatable output force transfer means operable by said input force applying means for transferring output force to the driven device; and input-output force correlation means being continuously operatively connected to and operable by said input force applying means and being continuously operatively connected to and operating said output force transfer means for variably changing the rotational speed and circumferential location of said output force transfer means relative to said input force applying means during each revolution in accordance with predetermined input-output force correlation characteristics to be provided by the drive system;

slot means on and rotatable with said rotatable output force transfer means for providing variably radially spaced locations of transfer of input force to said output force transfer means;

pin means associated with said input force transfer means and being received in said slot means for transferring force to said output force transfer means at variable radially spaced locations;

said slot means being inclined relative to a radial line extending from the axis of rotation of said output force transfer means;

adjustable mounting means for rotatably mounting said slot means on said output force transfer means and selectively changing the angle of inclination of said slot means and comprising:

a rotatable plug member being rotatably mounted on said output force transfer means;

a driven gear means provided on said rotatable plug means for causing rotation thereof; and a drive gear means provided on said output force transfer means for driving engagement with said driven gear means to selectively cause rotation thereof.

22. The invention as defined in claim 21 and wherein: said drive gear means comprising a worm gear; and said drive gear means comprising a spiral gear.

23. A drive system for driving a driven device such as the rear wheel of a bicycle or the like comprising:

input force applying means for applying force to the drive system;

rotatable output force transfer means for transferring output force to the driven device;

mounting means for rotatably mounting said rotatable output force transfer means and enabling rotation thereof relative to said mounting means in at least one direction;

input force transfer means for transferring input force from said input force applying means to said rotatable output force transfer means to cause rotation thereof in the one direction and transfer of output force to the driven device;

input-output force correlation means operatively associated with said input force transfer means for correlating input-output forces by rotative displacement of said rotatable output force transfer means relative to said input force transfer means during each revolution of the drive system; said input force applying means comprising rotatable crank shaft means mounted on a bicycle and a pair of pedal operated crank arm means connected to opposite end portions of said crank shaft means for operation by a bicycle rider;

said output force transfer means comprising a rotatable ring member having inner and outer peripheral surfaces with sprocket teeth on the outer peripheral surface to engage and drive a chain operatively connected to the rear wheel of the bicycle; and said input-output force correlating means comprising:

oscillator means pivotally connected to and being continuously movable with said crank arm means in a circular path during each revolution thereof;

cam follower means mounted on said oscillator member for controlling pivotal movement thereof;

cam means fixedly mounted relative to said oscillator means and being engageable with said cam follower means during each revolution of said crank arm means for causing controlled variable pivotal displacement of said oscillator means relative to said crank arm means during each revolution thereof;

ring gear means on the inner peripheral surface of said rotatable ring member for causing rotation thereof;

planet gear means engaged with said ring gear means and being connected to and movable with said oscillator means; and sun gear means engaged with said planet gear means for causing rotation thereof.

24. The invention as defined in claims 1 or 13 or 21 or 23 wherein said input-output force correlating means comprising:
  pin and slot connecting means between said rotatable output force transfer means and said input force transfer means for enabling relative rotative displacement therebetween.

25. The invention as defined in claim 24 and wherein said pin and slot connecting means comprising:
  slot means on and rotatable with said rotatable output force transfer means for providing variably radially spaced locations of transfer of input force to said output force transfer means; and
  pin means associated with said input force transfer means and being received in said slot means for transferring force to said output force transfer means at variable radially spaced locations.

26. The invention as defined in claim 25 and wherein:
  said slot means being inclined relative to a radial line extending from the axis of rotation of said output force transfer means.

27. The invention as defined in claim 26 and further comprising:
  adjustable slot mounting means for rotatably mounting said slot means on said output force transfer means and selectively changing the angle of inclination of said slot means.

28. The invention as defined in claim 27 and wherein said adjustable slot mounting means comprising:
  a rotatable plug member being rotatably mounted on said output force transfer means;
  a driven gear means provided on said rotatable plug means for causing rotation thereof; and
  a drive gear means provided on said output force transfer means for driving engagement with said driven gear means to selectively cause rotation thereof.

29. The invention as defined in claim 28 and wherein: said drive gear means comprising a worm gear; and said drive gear means comprising a spiral gear.

30. The invention as defined in claim 29 and wherein:
  said output force transfer means comprising a sprocket wheel member;
  said input force transfer means comprising a pedal operated crank arm member located axially adjacent said sprocket wheel member, a slider member mounted on said crank arm member for variable radial inward and outward displacement relative thereto, a shaft member mounted on said slider member and extending axially therefrom and having a portion variably radially located in said slot means; and
  cam means mounted in juxtaposition to and operative relationship with said shaft member for controlling the radial location of said shaft in said slot means.

31. An input-output force correlated drive system for driving a driven device such as the rear wheel of a bicycle or the like comprising:
  input force applying means for transmitting input force to and causing operation of the drive system;
  rotatable output force transfer means operable by said input force applying means for transferring output force to the driven device; and
  input-output force correlation means being continuously operatively connected to and operable by said input force applying means and being continuously operatively connected to and operating said output force transfer means for variably changing the rotational speed and circumferential location of said output force transfer means relative to said input force applying means during each revolution in accordance with predetermined input-output force correlation characteristics to be provided by the drive system; said input force applying means comprising and a pair of pedal operated crank arm means connected to opposite end portions of said crank shaft means for operation by a bicycle rider;
  said output force transfer means comprising a rotatable ring member having inner and outer peripheral surfaces with sprocket teeth on the outer peripheral surface to engage and drive a chain operatively connected to the rear wheel of the bicycle; and
  said input-output force correlating means comprising;
  oscillator means pivotally conneced to and being continuously movable with said crank arm means in a circular path during each revolution thereof;
  cam follower means mounted on said oscillator member for controlling pivotal movement thereof;
  cam means fixedly mounted relative to said oscillator means and being engageable with said cam follower means during each revolution of said crank arm means for causing controlled variable pivotal displacement of said oscillator means relative to said crank arm means during each revolution thereof;
  ring gear means on the inner peripheral surface of said rotatable ring member for causing rotation thereof;
  planet gear means engaged with said ring gear means and being connected to and movable with said oscillator means for causing rotation of said ring gear means; and
  sun gear means engaged with said planet gear means for causing rotation thereof.

32. A drive system for driving the rear wheel of a bicycle or the like comprising;
  input force applying means for applying force to the drive system;
  rotatable output force transfer means for transferring output force to the rear wheel of the bicycle;
  mounting means for rotatably mounting said rotatable output force transfer means and enabling rotation thereof relative to said mounting means in both forward and rearward directions;
  input force transfer means for transferring input force from said input force applying means to said rotatable output force transfer means to cause rotation thereof in the forward direction and transfer of output force to the rear wheel;
  input-output force correlation means operatively associated with said input force transfer means for correlating input-output forces by forward and rearward relative rotative displacement of said rotatable output force transfer means and said input force transfer means during each revolution of the drive system;
  said input force applying means comprising rotatable crank shaft means mounted on the bicycle and a pair of pedal operated crank wire means connected to opposite end portions of said crank shaft means for operation by a bicycle rider;
  said output force transfer means comprising a rotatable ring member having inner and outer peripheral surfaces with sprocket teeth on the outer peripheral surface to engage and drive a chian operatively connected to the rear wheel of the bicycle; and said input-output force correlating means comprising:
oscillator means pivotally connected to and being continuously movable with said crank arm means in a circular path each revolution thereof;
cam follower means mounted on said oscillator member for controlling pivotal movement thereof;
cam means fixedly mounted relative to said oscillator means and being engageable with said cam follower means during each revolution of said crank arm means for causing controlled variable pivotal displacement of said oscillator means relative to said crank arm means during each revolution thereof;
ring gear means on the inner peripheral surface of said rotatable ring member for causing rotation thereof;
planet gear means engaged with said ring gear means and being connected to and movable with said oscillator means for causing rotation of said ring gear means; and
sun gear means engaged with said planet gear means for causing rotation thereof.

33. An input-output force correlated drive system for driving a driven device such as the rear wheel of a bicycle or the like comprising:
input force applying means for transmitting input force to and causing operation of the drive system;
rotatable output force transfer means operable by said input force applying means for transferring output force to the driven device;
input-output force correlation means being continuously operatively connected to and operable by said input force applying means and being continuously operatively connected to and operating said output force transfer means for variably changing the rotational speed and circumferential location of said output force transfer means relative to said input force applying means during each revolution in accordance with predetermined input-output force correlation characteristics to be provided by the drive system;
drive shaft means being mounted in coaxial relationship with said rotatable output force transfer means and having a splined portion thereon for causing rotation of said output force transfer means;
a splined member mounted on said splined portion of said drive shaft means and being rotatably driven thereby and being axially displaceable relative thereto; and
pin and slot connecting means between said splined member and said rotatable output force transfer means for rotatably drivingly connecting said splined member to said rotatable output force transfer means and enabling rotative displacement of said rotatable output force transfer means relative to said input force transfer means.

34. The invention as defined in claim 33 and wherein said input-output force correlation means comprising:
a continuous cam surface extending 360° about said drive shaft means and being located in juxtaposition to said splined member; and
cam follower means mounted on said splined member and being engaged with said cam surface for causing axial displacement of said splined member during rotation thereof by said drive shaft means.

* * * * *